July 6, 1926.
J. Z. PUTMAN
LOCK
Filed July 17, 1925
1,591,777
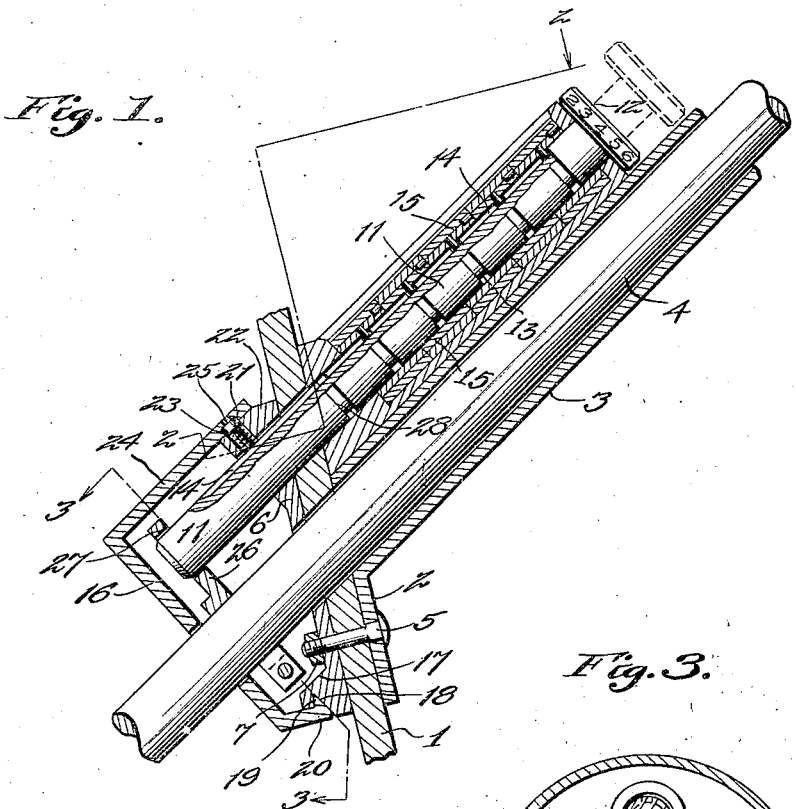
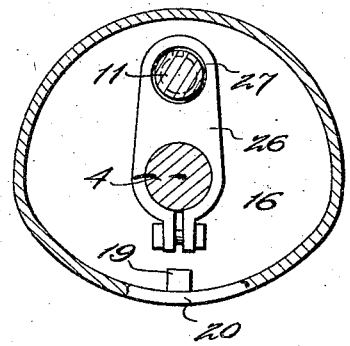
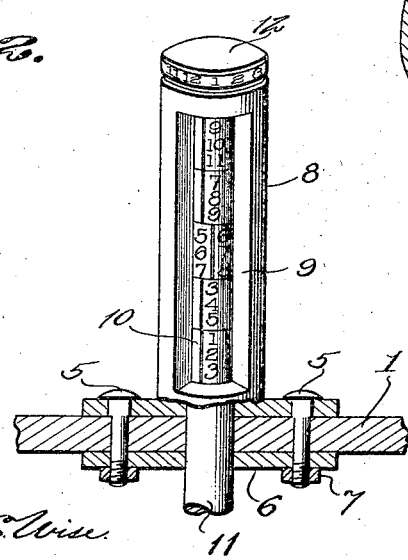
James Z. Putman
INVENTOR
BY Victor J. Evans
ATTORNEY
WITNESS:

Patented July 6, 1926.

1,591,777

UNITED STATES PATENT OFFICE.

JAMES Z. PUTMAN, OF BIGELOW, NEW YORK.

LOCK.

Application filed July 17, 1925. Serial No. 44,273.

The object is the provision of means for locking the steering post of an automobile from turning to prevent the stealth or unlawful use of the automobile.

A further object is the provision of a locking device for this purpose which may be readily attached to any ordinary construction of automobiles without altering the parts thereof.

A still further object is the provision of a device for this purpose in which the locking bolt cannot be moved to either locking or unlocking position except by the owner of the automobile or other authorized persons acquainted with the combination for the locking bolt.

A still further object is the provision of a device for this purpose which cannot be removed from the automobile except by the owner of the car or other person acquainted with the construction.

With the above recited objects in view the improvement consists in the construction, combination and operative association of parts such as is disclosed by the drawings which accompany and which form part of this application.

In the drawings:—

Figure 1 is an elevation illustrating the application of the improvement, parts being in section.

Figure 2 is a sectional view on the line 2—2 of Figure 1.

Figure 3 is a sectional view on the line 3—3 of Figure 1.

The front or dash board of an automobile body is, in the drawings, indicated by the numeral 1. To the dash 1 there is secured the flange 2 at the outer or lower end of the column 3 for the steering post 4 of the machine. The securing means between the flange 2 and the dash 1 are in the nature of bolts 5, and these bolts secure on the outer face of the dash a metal plate 6. The bolts are engaged by the usual nuts 7. Secured to the dash, and lying against the upper face of the steering post column 3, there is the cylindrical casing 8 of a combination lock. The outer face of the casing 8 is open, as at 9, whereby numbered discs 10 are observable, and also whereby the discs may be revolved. The discs are of the type ordinarily employed in combination locks, the bolt for the lock being indicated by the numeral 11, and the head 12 of the bolt rests on the outer closed end of the casing 8 and is peripherally provided with numbers. The shank of the bolt is provided with equidistantly spaced continuous grooves 13 and with a longitudinal groove 14 which intersects the grooves 13. By properly turning the discs and also properly turning the head 12 of the bolt, pins carried by the discs or rather between the discs and sleeves 15 arranged inwardly of said discs, will be brought either into the transverse grooves 13 or in align with the longitudinal groove 14 as is usual with such constructions. The bolt 11 passes through a bearing opening in the plate 6 and is received in a casing 16. The plate 6 has a flanged inner edge, the lower flange, for distinction, being indicated by the numeral 17 and this flange is formed with a substantially V-shaped notch 18 designed to receive therein a V-shaped lip 19 on the lower wall 20 of the casing 16. The upper or outer flange of the plate is provided with an opening therethrough, and in this opening there is received a spring influenced headed pin 21. The pin may be depressed into the longitudinal groove 14 of the bolt 11, in which instance, the head thereof lies flush with the outer face of the flange 22 of the said plate 6. This bolt is designed to be received in a round opening or depression 23 in the upper or outer flange 24 of the casing 16. There is a restricted opening 25 in the flange 24 which communicates with the depression or pocket 23 for the head of the pin 21. A suitable instrument is passed through the opening 25 and is forced against the head of the pin to bring the shank of the latter into the groove 14 of the bolt 11 before the casing can be removed or attached to the plate 6. Thus a person must have knowledge of the combination of the lock before the casing 16 can be removed from the remainder of the construction.

Fixed on the steering post at the portion thereof received in the casing 16, there is a plate 26. This plate, adjacent to its outer or free end, is provided with a round opening 27. When the bolt is in locking position, as disclosed in Figure 1 of the drawings, the shank thereof is received through the opening 27, and as the plate 26 is fixed to the steering post the latter cannot be turned. By reference to Figure 1 of the drawings it will be noted that the bolt 11 is provided with one more groove 13 than the number of discs in the combination lock. When the proper combination has been reached and the bolt has been drawn to the dotted line position in Figure 1 of the drawings, the lowermost disc is turned to bring its pin or tumbler into the lowermost groove in the bolt which, for distinction, is indicated by the numeral 28. Thus the bolt is held in unlocked position, and it is necessary that a person acquainted with the device turn the lower disc to bring the tumbler thereof in align with the longitudinal groove of the bolt before the bolt can again be moved to locking position.

The simplicity of the construction, the ease in which it may be applied without altering any of the parts of the automobile and the operation of the construction, will, it is thought, be perfectly apparent to those skilled in the art to which the invention relates when this description is read in connection with the accompanying drawings.

Having described the invention, I claim:—

In an automobile, the combination with a steering post column, the dash to whose inner face the column is secured and the steering post guided through the column, of a tumbler actuated combination lock including a bolt and which lock has its casing resting on the steering column and secured to the inner face of the dash, said bolt having both transverse continuous and a longitudinal groove for the reception of the tumblers of the lock, a plate fixed on the outer face of the dash, a casing, interengaging means between the casing and the bolt, characterized by a spring influenced slidable headed member which is movable into the longitudinal groove of the bolt when the latter is arranged opposite said member, said casing having a pocket to receive the head of the member therein and having a restricted opening communicating with the member and a plate removably fixed on the steering post and having an opening therethrough to receive the lock bolt therein, when the latter is moved to locking position to hold the steering post from turning.

In testimony whereof I affix my signature.

JAMES Z. PUTMAN.